Jan. 31, 1956 W. KOENIG, JR 2,733,304
BIDIRECTIONAL AMPLIFIERS
Filed Aug. 2, 1951 4 Sheets-Sheet 1

INVENTOR
W. KOENIG, JR.
BY
ATTORNEY

Jan. 31, 1956 W. KOENIG, JR 2,733,304
BIDIRECTIONAL AMPLIFIERS
Filed Aug. 2, 1951 4 Sheets-Sheet 2

INVENTOR
W. KOENIG, JR.
BY H. A. Burgess
ATTORNEY

Jan. 31, 1956

W. KOENIG, JR 2,733,304

BIDIRECTIONAL AMPLIFIERS

Filed Aug. 2, 1951

INVENTOR
W. KOENIG, JR.
BY
H. A. Burgess
ATTORNEY

Jan. 31, 1956  W. KOENIG, JR  2,733,304
BIDIRECTIONAL AMPLIFIERS
Filed Aug. 2, 1951  4 Sheets-Sheet 4

INVENTOR
W. KOENIG, JR.
BY
J.H.A.Burgess
ATTORNEY

United States Patent Office 2,733,304
Patented Jan. 31, 1956

2,733,304

BIDIRECTIONAL AMPLIFIERS

Walter Koenig, Jr., Clifton, N. J., assignor to Bell Telephone Laboratories, Incorporated, New York, N. Y., a corporation of New York Application August 2, 1951, Serial No. 239,948

9 Claims. (Cl. 179—170)

This invention relates to four-terminal networks employing transistors.

A principal object of the invention is a bidirectonal amplifier or other transducer.

Another object of the invention is a bidirectional amplifier having equal or unequal gain in both directions, as desired.

Another object of the invention is a bidirectional amplifier which is symmetrical, impedance-wise.

Another object of the invention is a bidirectional amplifier which is unsymmetrical, impedance-wise to connect between dissimilar loads.

It is also an object of the invention to obtain the advantages of push-pull operation in a bidirectional amplifier and more specifically to obtain these advantages without the necessity of either center taps in input and output transformers or connections to the pair of electrodes, one from each active element, which are connected together.

Other objects of the invention relate to bilateral four-terminal networks having various combinations of forward and backward gain, impedance and phase reversing characteristics.

Each of the circuits to be described by way of illustration includes as active elements semiconductor devices which are known as transistors, various forms of which are described for example in Patent 2,524,035, issued October 3, 1950, to J. Bardeen and W. H. Brattain and Patent 2,569,347, issued September 25, 1951, to W. Shockley. Each circuit includes two transistors connected in four-terminal network configuration but not connected in cascade. In each circuit, two electrodes, one from each transistor are connected together and the remaining electrodes, in pairs, comprise the terminals of the network. The present application is primarily concerned with those embodiments wherein the two electrodes connected together are unlike electrodes; the embodiments having a pair of like electrodes connected together are the subject matter of my copending application Serial No. 239,947 filed August 2, 1951. In all cases, however, at least one pair of output terminals comprises a pair of unlike electrodes.

The circuits just described have all the advantages of push-pull operation, e. g., cancellation of even harmonics and even order combination frequencies, higher power capacity, and higher impedance. In addition, they are bilateral which means that the power gain in both directions is, or can be made, greater than unity. Further, certain of the embodiments have equal gain in both directions. Some of the circuits have symmetrical impedances while others are unsymmetrical. Also, some of the embodiments produce 180-degree phase reversals while others transmit the signals without altering their phase. Certain of the aforementioned characteristics are functions of the terminating or load impedances and some are functions of frequency. The particular configuration which is desirable in a given case will therefore depend, to some degree, upon the loads between which the circuit is connected and also upon the signal frequency.

It is unnecessary in any of the circuits herein described to make any connection, either in the input or output meshes, to the junction of the two transistors except for battery supply purposes. This makes it unnecessary to be concerned with the separate impedances of the two transistors in the two meshes, which may be unsymmetrical. Transformers, for example, if required, need only match the input and output loads to the total impedance between the respective terminals.

Bilateral amplifiers are particularly useful as repeaters. A feature of the present invention is that with certain of the embodiments to be disclosed, direct current may readily be supplied to the transistors for biasing purposes from a remote point over the signalling path which makes unattended operation more feasible. Further, no hybrid coils or balancing networks are required as with conventional 22-type repeaters. Due to the dissimilar impedance characteristics of some of the illustrative embodiments, the latter may serve also as impedance matching devices in addition to providing bilateral gain.

These and other objects and features of the invention may be better understood from the following detailed description when read in accordance with the attached drawings, in which.

Figure 7:
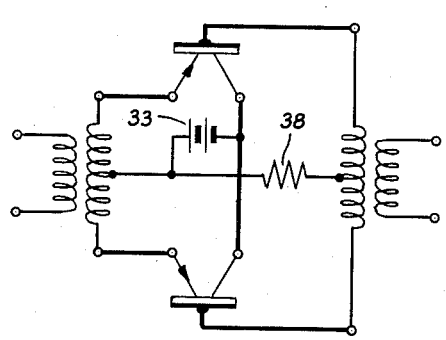
Figure 8:
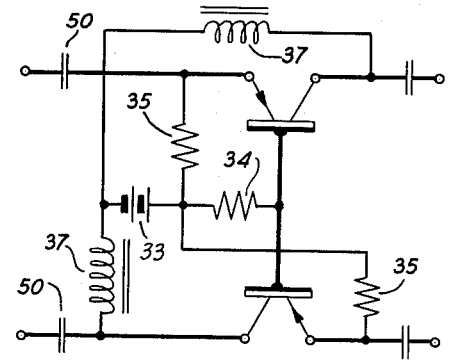
Figure 9:
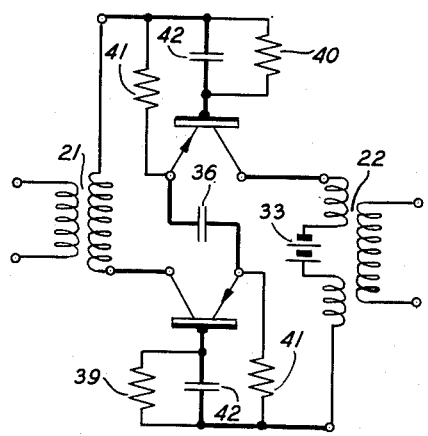
Figure 10:
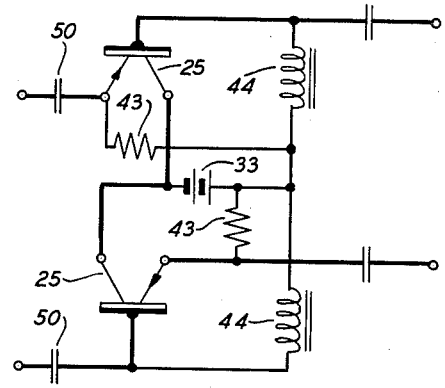
Figure 11:
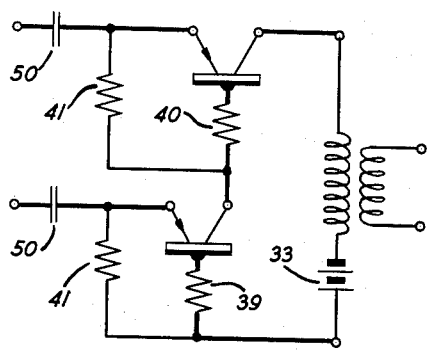
Figure 12:
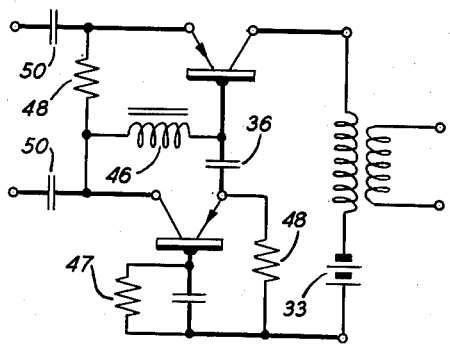
Figure 13:
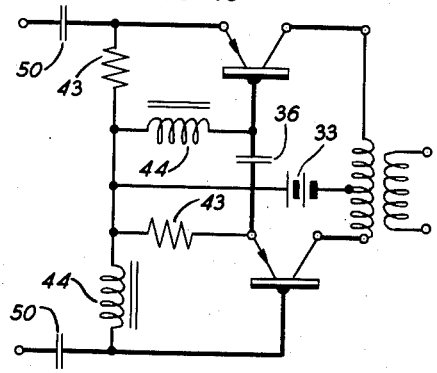
Figure 15:
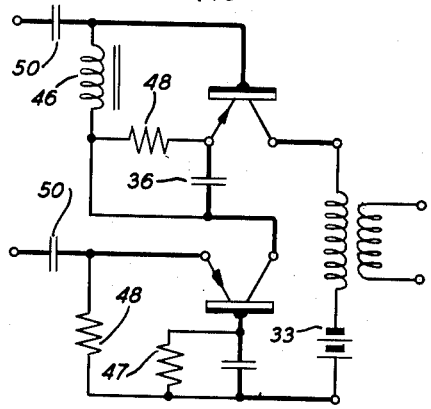
Figure 16:
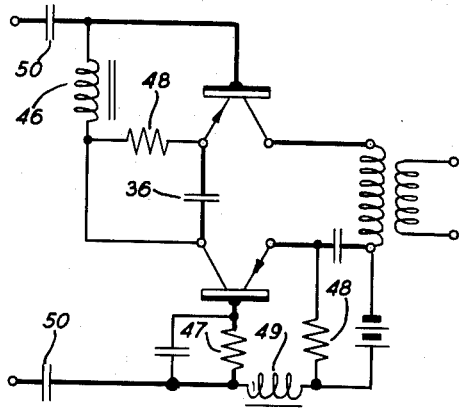
Figure 17:
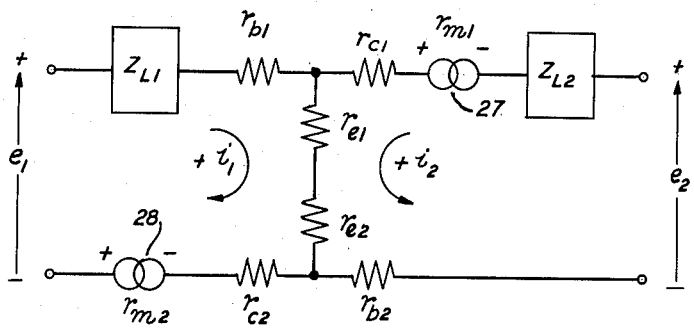
Figure 18:
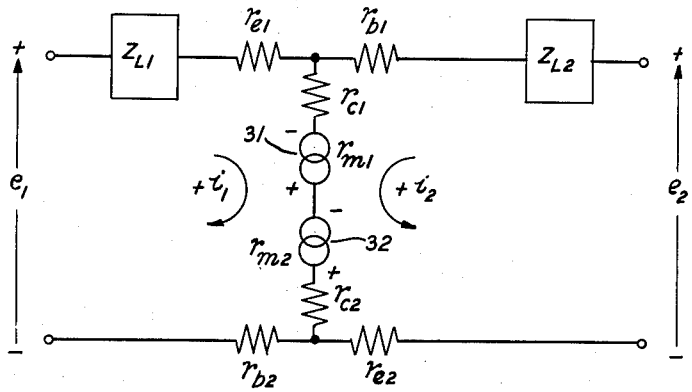
Figure 19:
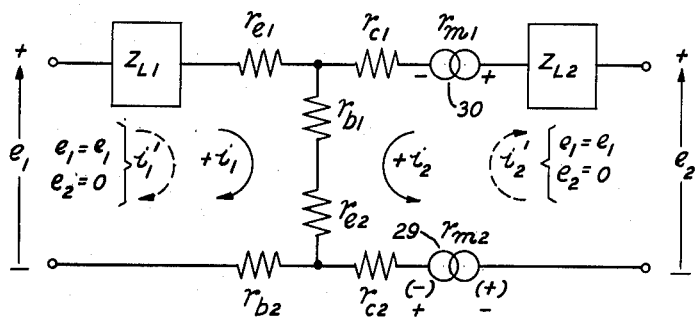

Figs. 5 through 16 illustrate schematically balanced transistor amplifiers embodying principles of the present invention; and Figs. 17, 18 and 19 are the equivalent circuits of Figs. 9, 10 and 13, respectively.

Figure 1:
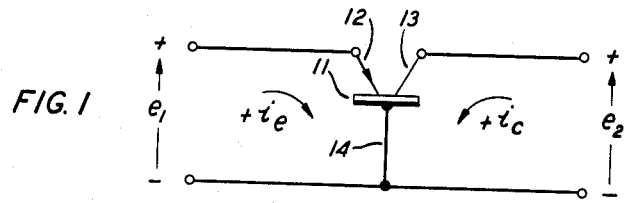
Fig. 1 shows schematically a single transistor.

In Fig. 1 there is represented schematically a transistor known as a "point-contact" transistor and which, in one of its forms, comprises a block of semiconductive material 11, for example, N-type germanium, and with which an emitter electrode 12, a collector electrode 13, and a base electrode 14 make operative contact. In the following description, electrode currents will be referred to as positive when they flow from the electrode into the block of semiconductive material. Therefore, the currents $i_e$ and $i_c$ illustrated in the figure represent, respectively, positive emitter and positive collector currents. When the semiconductive body 11 comprises N-type material, the emitter current $i_e$ will normally be positive and the collector current $i_c$ negative, with the latter exceeding the former in magnitude. When employed as an amplifier, a small bias will generally be applied to the emitter electrode and a larger negative bias to the collector electrode. If the semiconductive material comprises P-type material coated with a barrier layer of N type, the normal current directions and biases just mentioned will be of the opposite direction and polarity, respectively.

The illustrative embodiments of the invention to be described, and the invention itself may be best understood in terms of the four terminal network properties of the circuits. A brief discussion will, therefore, be given of four terminal networks in general.

Figure 2:
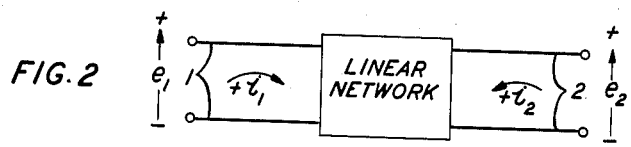
Figs. 2 and 3 illustrate four-terminal networks to be used in the following explanation.

Fig. 2 shows a four terminal linear network having two externally available meshes of interest, mesh 1 and mesh 2. Assuming positive currents $i_1$ and $i_2$ to be flowing in the external meshes, as shown in the figure, the relationship between these currents and the positive terminal voltages $e_1$ and $e_2$, where $e_1$, $e_2$, $i_1$ and $i_2$ may be complex functions, may be expressed by the following mesh equations:

$$e_1 = i_1 Z_{11} + i_2 Z_{12} \quad (1)$$

$$e_2 = i_1 Z_{21} + i_2 Z_{22} \quad (2)$$

The Z's may also be complex functions and are the conventional impedance parameters of a four terminal network. $Z_{11}$ is the self impedance of mesh 1 when mesh 2 is open and $Z_{22}$ is the self impedance of mesh 2 when mesh 1 is open; $Z_{12}$ is the impedance which produces a voltage drop in mesh 1 due to a current in mesh 2 and $Z_{21}$ is the impedance which produces a voltage drop in mesh 2 due to a current in mesh 1.

The impedance or system determinant $\Delta$ of the above pair of mesh equations is:

$$\Delta = \begin{vmatrix} Z_{11} & Z_{12} \\ Z_{21} & Z_{22} \end{vmatrix} = Z_{11}Z_{22} - Z_{12}Z_{21} \qquad (3)$$

With passive networks, $Z_{12}$ will equal $Z_{21}$, as it will even with some active networks. However, as will be shown, when the network involves transistors, $Z_{12}$ will, in general, not be equal to $Z_{21}$.

Figure 3:
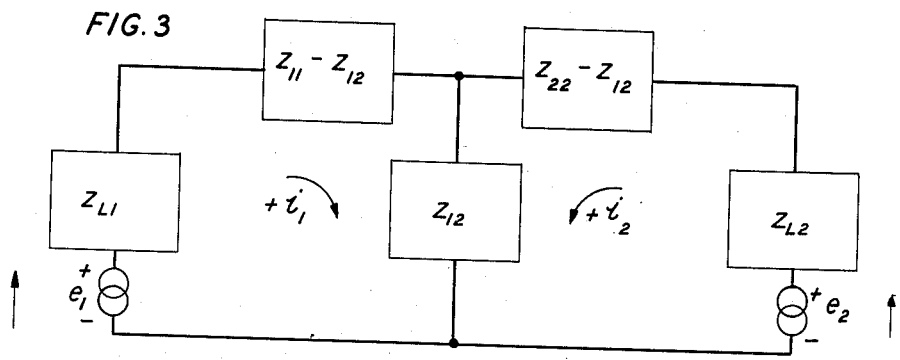

Fig. 3 shows the equivalent T of a four terminal network having the impedance parameters as defined above and including also two voltage sources $e_1$ and $e_2$ and two external impedances $Z_{L1}$ and $Z_{L2}$ connected, respectively, in mesh 1 and mesh 2. The above mesh equations will represent the current voltage relations of this circuit if to $Z_{11}$ is added $Z_{L1}$ and if to $Z_{22}$ is added $Z_{L2}$ so that $$\Delta = \begin{vmatrix} Z_{11}+Z_{L1} & Z_{12} \\ Z_{21} & Z_{22}+Z_{L2} \end{vmatrix} = (Z_{11}+Z_{L1})(Z_{22}+Z_{L2}) - (Z_{12})(Z_{21}) \qquad (4)$$

when driving from mesh 1, $Z_{L1}$ may be considered the effective internal impedance of the source $e_1$, $Z_{L2}$ the load impedance, and $e_2$ will ordinarily equal zero. Similarly, when driving from mesh 2, $Z_{L2}$ will represent the internal impedance of the source $e_2$, $Z_{L1}$ will be the load impedance and $e_1$ will ordinarily equal zero.

Figure 4:
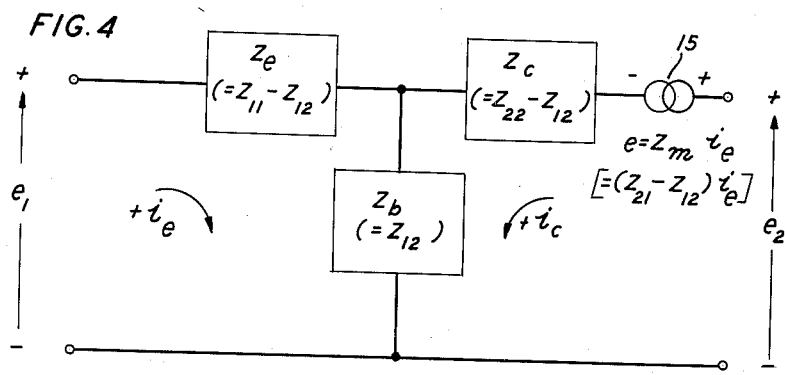
Fig. 4 shows schematically the equivalent circuit of a single transistor amplifier connected in grounded base configuration.

The equivalent T representation of a transistor connected in grounded base configuration is shown in Fig. 4 in which the emitter impedance is represented as $Z_e$, the collector impedance as $Z_c$, the base impedance as $Z_b$ and the net mutual or trans-impedance as $Z_m$. The active element of the transistor is represented as a voltage generator 15 having a polarity as shown, assuming positive emitter current, and producing a voltage equal to $Z_m i_e$ where $i_e$ is the signal current flowing in the emitter electrode. As indicated from Fig. 4, the impedances of the equivalent transistor circuit can be defined in terms of the conventional four terminal impedances:

$$Z_e = Z_{11} - Z_{12} \qquad (5)$$

$$Z_b = Z_{12} \qquad (6)$$

$$Z_c = Z_{22} - Z_{12} \qquad (7)$$

$$Z_m = Z_{21} - Z_{12} \qquad (8)$$

For most purposes and for the purposes of the present discussion the reactive components of the equivalent transistor impedances will be negligible; therefore, the transistor impedance parameters will herein be designated $r_e$, $r_b$, $r_c$ and $r_m$.

By writing the mesh equations for the circuit of Fig. 4 the system determinant for this circuit may be shown to be:

$$\Delta = \begin{vmatrix} r_e+r_b & r_b \\ r_b+r_m & r_c+r_b \end{vmatrix} \qquad (9)$$

It may be noted from the above, that as a result of the equivalent generator 15, in the collector circuit of the circuit of Fig. 4, $Z_{12}$ is not equal to $Z_{21}$ for a single transistor in grounded base configuration. In writing mesh equations for circuits including transistors, it must be remembered that $r_m$ is a mutual or trans-impedance rather than a self impedance and one which produces a voltage drop in the mesh including the collector electrode, due to a current in the mesh including the emitter electrode. These meshes, in some circuital configurations, may be the same.

Referring to Fig. 4, a current flowing into the semiconductive body from the emitter, i. e. a positive emitter current will produce a current flowing out of the semiconductive body to the collector electrode, i. e. a negative collector current, as previously stated; thus, the terminal of the equivalent generator 15 remote from the semiconductive base is positive. The polarity of the equivalent generator terminals determines the sign to be given $r_m$ when writing mesh equations by indicating either a voltage rise or a voltage drop, depending on the direction of the assumed positive mesh current in the mesh including the generator. For example, in Fig. 4, $r_m$ appears only in the $Z_{21}$ term since it produces a voltage drop in mesh 2 due to a current in mesh 1 and it is positive since it is a voltage drop in the direction of the assumed positive mesh 2 current. The importance of these considerations will become more apparent in discussing the four terminal networks below which each comprise two transistors connected in various configurations.

A useful parameter of transistors is the current gain $\alpha$ which is defined as the ratio of $$\frac{i_c}{i_e}$$

when $Z_{L1}$ and $Z_{L2}$ are both zero or in terms of four terminal parameters $$\frac{i_2}{i_1}$$

By way of illustration, the parameter $\alpha$ for most point-contact transistors will exceed unity whereas for most "junction" transistors, it will usually be less than unity, often by a very small amount. From the four terminal mesh Equations Numbers 1 and 2 when $e_2 = 0$:

$$i_1 = \frac{e_1 Z_{22}}{\Delta} \qquad (10)$$

$$i_2 = -\frac{e_1 Z_{21}}{\Delta} \qquad (11)$$

The current gain $\alpha$ of a four terminal network having a voltage source in mesh 1 only, is therefore:

$$\alpha = -\frac{Z_{21}}{Z_{22}} \qquad (12)$$

for the equivalent transistor network in Fig. 4:

$$\alpha = -\frac{r_m + r_b}{r_c + r_b} \qquad (13)$$

Since both $r_m$ and $r_c$ are generally very large with respect to $r_b$:

$$\alpha \approx -\frac{r_m}{r_c} \qquad (14)$$

NOTE.—The symbol $\approx$ is herein used to mean "is approximately equal to."

The power or operating gain of a four terminal network is defined as the ratio of the useful power in one mesh to the power available in the other mesh. Referring to Fig. 3, the power gain from left to right will be the ratio of the power $P_L$ in the load $Z_{L2}$ to the power $P_G$ available in the generator $e_1$. The load impedance $Z_{L2}$ will be represented by the complex quantity $l_2 + jl_2'$. The power in the resistive component of the load is:

$$P_L = i_2{}^2 l_2 = \left[\left(\frac{V_G Z_{21}}{\Delta}\right)\right]^2 l_2 \qquad (15)$$

The power available at the generator, representing the generator impedance $Z_{L1}$ by the complex quantity $l_1 + jl_1'$ is:

$$P_G = \frac{V_G{}^2}{4l_1} \qquad (16)$$

Therefore, the power gain from left to right i. e. when applying energy from a source in mesh 1 to a load connected in mesh 2 is:

$$G_{12} = \frac{P_L}{P_G} = 4l_1 l_2 \left|\frac{Z_{21}}{\Delta}\right|^2 \quad (17)$$

By similar analysis, it may be shown that the gain from right to left for a generator in mesh 2 and a load in mesh 1 is:

$$G_{21} = 4l_1 l_2 \left|\frac{Z_{12}}{\Delta}\right|^2 \quad (18)$$

From Equations 17 and 18, it may be seen that if $|Z_{12}|$ is equal to $|Z_{21}|$ the operating gain will be equal in both directions.

For appreciable gain in either direction $\Delta$ must be small and $Z_{12}$, or $Z_{21}$, as the case may be, must be large. $Z_{12}$ and $Z_{21}$ will depend only on the transistor parameters and the manner of connection. $\Delta$, however is a function of the impedances $Z_{L1}$ and $Z_{L2}$ connected in the external meshes so that the gain will be dependent on the values of these terminations. It should be noted that in determining $\Delta$, both resistive and reactive components of these impedances must be included.

From Equation 4:

$$\Delta = (Z_{11} + l_1 + jl'_1)(Z_{22} + l_2 + jl'_2) - (Z_{12})(Z_{21}) \quad (19)$$

The four terminal parameters $Z_{11}$, $Z_{12}$, $Z_{21}$ and $Z_{22}$ have not been broken into resistive and reactive components since these parameters in the circuits to be described below are essentially resistances with negligible reactive components. Therefore, Equation 19 may be expressed:

$$\Delta = (R_{11} + l_1 + jl'_1)(R_{22} + l_2 + jl'_2) - R_{12}R_{21} \quad (20)$$

From Equation 20, if the load impedances have negligible reactive components:

$$\Delta_R = (R_{11} + l_1)(R_{22} + l_2) - R_{12}R_{21} \quad (21)$$

This equation represents the difference of two resistance products. By proper selection of parameters it may be seen that $\Delta$ may be made quite small, permitting large gain.

The solution is complicated, however, if the loads have appreciable reactive components since then, from Equation 20:

$$\Delta_x = R_{11}R_{22} + R_{11}l_2 + R_{22}l_1 + l_1 l_2 - l'_1 l'_2 + \\ j(R_{11}l'_2 + R_{22}l'_1 + l_1 l'_2 + l_2 l'_1) - R_1 R_2 \quad (22)$$

From Equation 21

$$\Delta_R = R_{11}R_{22} + R_{11}l_2 + R_{22}l_1 + l_1 l_2 - R_1 R_2 \quad (23)$$

substituting $\Delta_R$ in Equation 22:

$$\Delta_x = \Delta_R - l'_1 l'_2 + j[R_{11}l'_2 + R_{22}l'_1 + l_1 l'_2 + l_2 l'_1] \quad (24)$$

The imaginary term in Equation 24 cannot, of course, be subtracted from the real terms even though the algebraic signs are favorable. To minimize $\Delta_x$, therefore, it is desirable that (1) $\Delta_R$ and $(l'_1 l'_2)$ have the same signs so as to subtract from each other; (2) the imaginary ($j$) term equal zero.

The ($j$) term will equal zero when:

$$\frac{l'_1}{l'_2} = -\frac{R_{11} + l_1}{R_{22} + l_2} \quad (25)$$

This will occur, for example, if $R_{11} = -R_{12}$ and if the load impedances are equal and have a 45 degree angle, so that $l'_1 = l_1 = l'_2 = l_2$. If $R_{11}$ and $R_{22}$ are both positive, $l'_1$ and $l'_2$ must have opposite signs i. e. one load must be capacitive, one inductive, the absolute magnitude of the loads depending on the magnitude of $R_{11}$ and $R_{22}$. If either or both $R_{11}$ and $R_{22}$ are negative, then $l'_1$ and $l'_2$ may have the same sign, depending on the magnitude of $R_{11}$ and $R_{22}$. Of course, if the reactive components and hence phase angles are functions of frequency, the gains will also vary with frequency.

The driving point impedance of the four terminal networks in Fig. 2 "looking into" mesh 1 is:

$$Z_1 = Z_{11} - \frac{Z_{12} Z_{21}}{Z_{22}} \quad (26)$$

The driving point impedance "looking into" mesh 2 is:

$$Z_2 = Z_{22} - \frac{Z_{21} Z_{12}}{Z_{11}} \quad (27)$$

From Equations 26 and 27 it may be shown that the driving point impedances $Z_1$ and $Z_2$ will equal if $Z_{11}$ equals $Z_{22}$. When this condition exists, the circuit is deemed symmetrical, impedance-wise.

From the mesh Equations 1 and 2, the following current voltage relations may be derived:

$$\frac{i_1}{e_1} = \frac{Z_{22}}{\Delta} \quad (28)$$

$$\frac{i_2}{e_1} = \frac{-Z_{21}}{\Delta} \quad (29)$$

$$\frac{i_1}{e_2} = \frac{-Z_{12}}{\Delta} \quad (30)$$

$$\frac{i_2}{e_2} = \frac{Z_{11}}{\Delta} \quad (31)$$

The above equations are useful in determining phase reversals from mesh 1 to mesh 2 or vice versa. Positive directions of current flow for positive terminal voltages are as shown in Fig. 2. For example, it may be seen from Equations 28 and 29 that if $Z_{22}$ and $Z_{21}$ both have the same sign there will be no phase reversal in the current flow from mesh 1 to mesh 2, i. e. $i_1$ due to a positive $e_1$ will be positive and $i_2$ due to a positive $e_1$ will be negative, both flowing clockwise in their respective meshes. Similarly from Equations 30 and 31, if $Z_{12}$ and $Z_{11}$ have the same sign there will be no phase reversal from mesh 2 to mesh 1. These of course assume that $Z_{22}$ and $Z_{21}$, and, $Z_{12}$ and $Z_{11}$ have the same phase angle but as previously indicated, in the circuits of interest, herein, these parameters will for most purposes have negligible reactive components. Reactive components in the load impedances will not affect these generalizations but only the absolute values of the phase angles since they affect only $\Delta$.

From the aforegoing analysis it may be seen that many of the important features of a four terminal network and particularly the networks about to be described may readily be determined from the network determinant. Each of the specifically disclosed embodiments will therefore be described with reference to its determinant.

Figure 5:
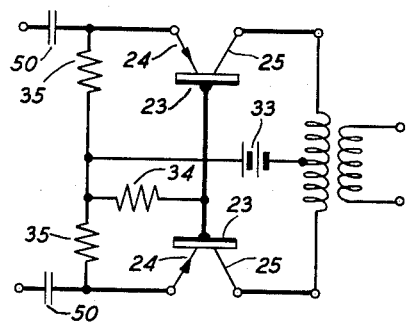
Figure 6:
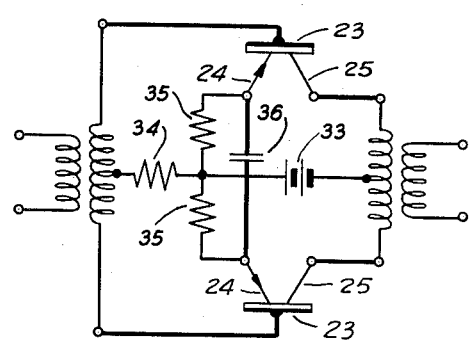

Figs. 5 through 16 illustrate twelve four-terminal transistor circuits. Each of these circuits employs two transistors having two meshes of interest to which external circuits may be connected. The circuits of Figs. 5, 6 and 7 are characterized by the connection of two transistors together by like electrodes and by terminals comprising pairs of like electrodes. These circuits are simply push-pull versions of single transistor circuits and therefore comprise no part of the invention but are shown only for illustration. The circuits of Figs. 8, 9 and 10, which comprise the principal subject-matter of my above-mentioned copending application, also comprise two transistors having a pair of like electrodes connected together but, in accordance with principles of the invention, the terminals to which external circuits are connected comprise pairs of unlike electrodes. The circuits of Figs. 11 through 16 each comprise a pair of transistors having a pair of unlike electrodes connected together and comprise the principal subject-matter of the present invention. In all embodiments of the invention at least one pair of terminals comprises a pair of unlike electrodes. For the present, the discussion will be interested only in those parts of the circuits which are shown in heavy lines, the remaining portions of the circuits being either external connections or battery supply circuits which will be described later.

The determinants for the transistor portions of the circuits of Figs. 5 through 16 are listed in tabular form below. These determinants include only the transistor parameters plus a load impedance $Z_{L1}$ which is assumed to be the load impedance across the left-hand pair of terminals of the four terminal networks and a load impedance $Z_{L2}$ which is the load impedance across the right-hand pair of terminals. They also assume that the two transistors in each circuit have identical parameters.

Table I

| Fig. | $\Delta = \begin{vmatrix} A & B \\ C & D \end{vmatrix}$ | |
|---|---|---|
| 5 | $\begin{cases} 2(r_b+r_e)+Z_{L1} \; (+) \\ 2(r_b+r_m) \; (+) \end{cases}$ | $2r_b \; (+)$ <br> $2(r_b+r_e)+Z_{L2} \; (+)$ |
| 6 | $\begin{cases} 2(r_b+r_e)+Z_{L1} \; (+) \\ 2(r_e-r_m) \; (-) \end{cases}$ | $2r_e \; (+)$ <br> $2(r_e+r_c-r_m)+Z_{L2} \; (-)*$ |
| 7 | $\begin{cases} 2(r_e+r_c-r_m)+Z_{L1} \; (-)* \\ 2(r_c-r_m) \; (-) \end{cases}$ | $2r_c \; (+)$ <br> $2(r_b+r_e)+Z_{L2} \; (+)$ |
| 8 | $\begin{cases} 2r_b+r_e+r_c+Z_{L1} \; (+) \\ 2r_b+r_m \; (+) \end{cases}$ | $2r_b+r_m \; (+)$ <br> $2r_b+r_e+r_c+Z_{L2} \; (+)$ |
| 9 | $\begin{cases} 2r_e+r_b+r_c-r_m+Z_{L1} \; (+)* \\ 2r_e-r_m \; (-) \end{cases}$ | $2r_e-r_m \; (-)$ <br> $2r_e+r_b+r_c-r_m+Z_{L2} \; (+)*$ <br> $(\pm)$ |
| 10 | $\begin{cases} r_e-r_m+r_b+2r_c+Z_{L1} \; (+)* \\ 2r_c-r_m \; (\pm) \end{cases}$ | $2r_c-r_m$ <br> $r_e-r_m+r_b+2r_c+Z_{L2} \; (+)*$ |
| 11 | $\begin{cases} r_b+2r_e+r_c-r_m+Z_{L1} \; (+)* \\ r_b+r_e \; (+) \end{cases}$ | $r_b+r_e \; (+)$ <br> $2r_b+2r_e+Z_{L2} \; (+)$ <br> $(-)$ |
| 12 | $\begin{cases} r_b+2r_e+r_c-r_m+Z_{L1} \; (-)* \\ r_b+r_e+r_m \; (+) \end{cases}$ | $r_b+r_e-r_m \; (+)$ <br> $2r_b+r_e+r_c+Z_{L2} \; (+)$ |
| 13 | $\begin{cases} 2(r_b+r_e)+Z_{L1} \; (+) \\ r_b+r_e \; (+) \end{cases}$ | $r_b+r_e \; (+)*$ <br> $r_b+r_e+2r_c-r_m+Z_{L2} \; (-)$ |
| 14 | $\begin{cases} 2r_b+r_e+r_c+Z_{L1} \; (+) \\ r_b+r_e+r_m \; (+) \end{cases}$ | $r_b+r_c-r_m \; (-)*$ <br> $r_b+r_e+2r_c-r_m+Z_{L2} \; (+)$ |
| 15 | $\begin{cases} r_b+2r_e+r_c-r_m+Z_{L1} \; (-)* \\ r_e+r_c-r_m \; (+) \end{cases}$ | $r_e+r_c \; (+)*$ <br> $r_b+r_e+2r_c-r_m+Z_{L2} \; (-)$ |
| 16 | $\begin{cases} 2r_b+r_e+r_c+Z_{L1} \; (+) \\ r_e+r_c-r_m \; (-) \end{cases}$ | $r_e+r_c-r_m \; (+)*$ <br> $2(r_e+r_c-r_m)+Z_{L2} \; (+)*$ |

*By choice.

For convenience, the four-terminal parameters of each determinant will be designated $$\begin{vmatrix} A & B \\ C & D \end{vmatrix}$$

where:

$A = Z_{11}+Z_{L1}$     (32)
$B = Z_{12}$     (33)
$C = Z_{21}$     (34)
$D = Z_{22}+Z_{L2}$     (35)

By way of illustration and to impart more meaning to the discussion, the following table sets forth typical values for the equivalent circuit parameters of a transistor.

$r_b = 290$ ohms
$r_e = 240$ ohms
$r_c = 19,000$ ohms
$r_m = 34,000$ ohms

It may be noted that for most purposes, $r_b$ and $r_e$ are negligible with respect to $r_c$ and $r_m$. These parameters will of course vary, particularly and most importantly $r_c$ and $r_m$ since $$\alpha \approx \frac{r_m}{r_c}$$

These exemplary values, however, illustrate the general magnitude of the various parameters.

The equal circuits of Figs. 5 and 6 are essentially unilateral since they provide little or no gain in the right to left direction. This may be seen by referring to their system determinants set forth above since the B terms (i. e. $Z_{12}$) in each of these cases is quite small. These circuits are essentially push-pull equivalents of single transistor amplifiers of the grounded base and grounded emitter configuration, respectively, and have the usual features of push-pull operation. The circuit shown in Fig. 7 is disclosed in my copending application Serial No. 212,639, filed February 24, 1951, which issued December 8, 1953, as Patent No. 2,662,123. Referring to the B and C terms of the Fig. 7 determinant, it may be seen that if $\alpha = 2$, then $|B| = |C|$, indicating equal gain in both directions. If $\alpha \neq 2$, the gain in the two directions will be unequal and if $\alpha \approx 1$, there will be little or no gain in the left to right direction since if $\alpha \approx 1$, $r_m \approx r_c$ so that $C \approx 0$.

The circuits of Figs. 5, 6 and 7 are characterized by the connection together of a pair of like electrodes and by the utilization of the remaining electrodes in pairs of like electrodes, as output terminals, each of the pairs comprising an electrode from each transistor. In Fig. 5, the base electrodes 23 are connected together, the emitter electrodes 24 comprise one pair of terminals and the collector electrodes 25 the other pair of terminals. In Fig. 6, the emitter electrodes 24 are connected together, through a condenser 36, and the base electrodes 23 and collector electrodes 25 are utilized as terminals to which connections to external circuits may be made. The collector electrodes are connected together in Fig. 7 and the emitter electrodes and base electrodes, respectively, comprise the two pairs of terminals of the four-terminal circuit. In accordance with principles of the invention, bilateral transmission with gain in both directions may be obtained together with the advantages of push-pull operation either by connecting together a pair of like electrodes from two transistors and utilizing the remaining electrodes in pairs of unlike electrodes as terminals, or by connecting together a pair of unlike electrodes and utilizing the remaining electrodes in pairs as terminals, the pairs in all cases comprising one electrode from each transistor.

Figs. 8, 9 and 10 illustrate embodiments of the first-mentioned type which comprise the subject-matter of my first-mentioned copending application; these are characterized, circuitwise, by the interconnection of a pair of like electrodes and by the utilization of the remaining electrodes in pairs of unlike electrodes as terminals. The electrodes are numbered similarly throughout Figs. 5 through 16 so that the exact electrodes connected together and those to which terminals are connected will not be recited for each case, this being obvious by reference to the drawings. As with the symmetrical circuits of Figs. 5, 6 and 7, each has two meshes of interest with the interconnected electrodes being common to both meshes. Since transistors are primarily current controlled devices, it is unnecessary to make any connection in either mesh to the junction of the two transistors except for battery supply purposes. Therefore, for impedance matching purposes, it is necessary to consider only the total impedance of each mesh and dissymmetry in impedance between the two transistors becomes for for this purpose at least, immaterial. For example, the transformers 21 and 22 in Fig. 9 need only match the external loads to the total impedances between the respective terminals. It should be noted that transistors, as current controlled devices, have relatively low impedances compared to vacuum tubes between all pairs of elements which lends to their practicability.

These same features apply also to the embodiments of Figs. 11 through 16 which illustrate the second-mentioned type, characterized by the connection together of a pair of unlike electrodes. These embodiments illustrate the subject-matter with which the present application is primarily concerned. The external terminals in some cases comprise pairs of like electrodes, and in other pairs of unlike electrodes, each embodiment having at least one pair of terminals comprising a pair of unlike electrodes.

Many of the characteristics and features of the illustrative circuits may be understood by referring to their system determinants set forth in the above table. To simplify the discussion, the transistors of each pair have been assumed to have the same equivalent circuit parameters so that the Δ's tabulated above will hold true. It should be noted that even if there are differences in the parameters $r_e$, $r_c$ and $r_b$, these can in many cases be effectively eliminated by the addition of external resistors in series with the appropriate electrode.

As previously shown, the operating gain from left to right will equal the operating gain from right to left if $|Z_{21}|=|Z_{12}|$, or, using the designations per (33) and (34) if $B=C$. From the above Table 1 it may be seen that the circuits of Figs. 8, 9, 10, 11, 13 and 16 have bilateral gain which in all cases is equal in both directions. It will not in all cases be appreciable, however. For example, since $$\alpha \approx \frac{r_m}{r_e}$$

the circuit of Fig. 10 will have little or no gain in either direction if $\alpha \approx 2$. (If $\alpha \approx 2$, $|B|=|C|\approx 0$.) If this embodiment is desired, transistors with either $\alpha \approx 1$ or $\alpha \gg 2$ should be chosen. Similarly, the Fig. 16 embodiment will have little or no gain if $\alpha \approx 1$ since $r_e$ is very small. For this embodiment, transistors having an $\alpha$ of 2 or more will in most cases be desirable. The Fig. 13 embodiment will have practically no gain regardless of $\alpha$ since both $r_b$ and $r_e$ are very small. The remaining embodiments having equal gain in both directions, Figs. 8, 9 and 11 may have appreciable gain, depending largely on the magnitude of Δ.

The embodiment of Fig. 12 also has bilateral gain which, although not theoretically equal in both directions will be substantially equal, since $r_b$ and $r_e$ are very small. Neglecting these terms for Fig. 12, $|B|=|C|=|r_m|$, indicating equal gain in both directions. The embodiment of Fig. 14 will have bilateral gain if $\alpha \neq 1$. (If $\alpha=1$, the B term approaches zero so that there will be little or no gain in the right to left direction.) It will not, however, be equal in both directions although the gain in the two directions will approach equality as $\alpha$ gets larger. The Fig. 15 circuit will similarly have little or no gain in the left to right direction if $\alpha \approx 1$. With this embodiment, however, the gain in the two directions will be equal if $\alpha \approx 2$, $r_e$ being negligible.

As was previously indicated since the power gain in either direction is a function of $$\left|\frac{1}{\Delta}\right|^2$$

it is desirable to keep Δ small. This may necessitate either selection of transistors having critical $\alpha$'s or it may impose limitations on the terminal load impedance $Z_{L1}$ and $Z_{L2}$. However, when proportioning the values of A, B, C and D it must be remembered that it is necessary that Δ be positive in order that the circuit remain stable. Both considerations must, therefore, be kept in mind when proportioning the components of Δ.

For the present the load impedances $Z_{L1}$ and $Z_{L2}$ will be assumed to be pure resistances.

The A, B, C and D components of the determinant for Fig. 5 will in all cases be positive; the signs of the determinant terms have been indicated in parentheses above each term in the table. Since $\Delta=AD-BC$, Δ will be small if $AD \approx BC$; remembering however that for stability it is necessary that $AD>BC$. These considerations will be largely determined by the load impedances.

The A and B terms of the determinant for Fig. 6 will necessarily be positive and the C term will be negative. Therefore, since $(-BC)$ will be positive, it is desirable in order to keep Δ small that D be negative so that the AB term will subtract from the $(-BC)$ term. The fact that the D term is negative by choice is indicated in the table by the asterisk. A relatively large $\alpha$ will be required to make D negative which will make $r_m$ large relative to $r_c$; the load impedance $Z_{L2}$ must not, of course, be so large as to overcome the negative effect of $r_m$. From inspection it may be seen that the BC term will not be very large. Therefore, since it will be necessary for stability that $BC>AD$, it will probably be necessary to limit the magnitude of the load impedance $Z_{L1}$ and $Z_{L2}$.

The B and D terms of the determinant for the circuit of Fig. 7 will in all cases be positive while the C term, if $\alpha>1$, will be negative. It is, therefore, desirable to make the A term negative to keep Δ small, which may be done by making $\alpha$ substantially greater than 1. The limitations on the load impedance will not be as severe in this case as with the embodiment of Fig. 6 since making $\alpha$ large will also make B and hence BC large.

The determinant of Fig. 8 affords little opportunity for selection of parameters since all terms are positive. It may be seen, however, that Δ will increase as the load impedances increase so that the power gain in either direction for the circuit of Fig. 8 will vary in an inverse relation with the load impedances.

The $(-BC)$ term of the Fig. 9 determinant will have a negative sign since both B and C are negative. For stability, therefore, it is necessary that the (AD) term have a positive sign which requires that A and D be either both positive or both negative. If the transistors have small $\alpha$'s (so that $r_m$ is not much greater than $r_c$) to make both A and D negative will impose severe limitations on the magnitude of the load impedances. It will, therefore, be easier in most cases to make both A and D positive which may readily be accomplished with transistors having small $\alpha$'s.

If $\alpha$ is less than 2, the B and C terms of the Fig. 10 determinant will both be negative; if $\alpha$ is greater than 2 they will both be positive. In either case, the $(-BC)$ product will have a negative sign so that for stability it will be necessary that A and D be either both positive or both negative. Again by inspection it will be seen that in most cases it will be easier to make A and D both positive since this may be done with transistors having small $\alpha$'s and without unduly restricting the magnitude of the load impedances. It is, of course, necessary that $|AD|>|BC|$ for stability.

The B, C and D terms of the Fig. 11 determinant are all positive, so that the A term must be made positive for stability. This may be accomplished either with a large $Z_{L1}$ or a small $\alpha$ or both. However, it is desirable that the load impedances be kept small to keep Δ small.

The B term of Fig. 12 determinant will be negative while the C and D terms are both positive. Therefore, to keep Δ small it is desirable to make A negative, which may readily be accomplished if $\alpha$ is large.

In the Fig. 13 determinant, it is necessary that D be positive for stability since A, B and C are all positive. D may be made positive either by employing a small $\alpha$ or a large $Z_{L2}$ or both.

Figure 14:
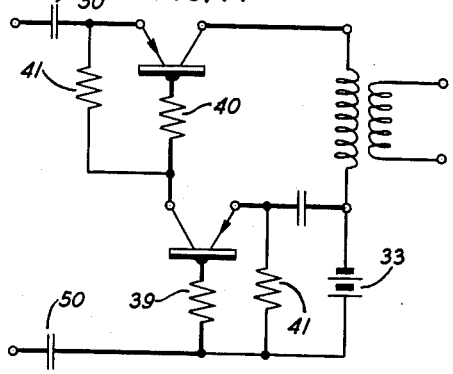

If $\alpha>1$, as is usually the case with point-contact transistors, the B term of the Fig. 14 determinant will be negative, assuming $r_b$ negligible, and the A and C terms will be positive, the signs of the latter two being independent of the value of $\alpha$. Therefore, to keep $\Delta$ small it is necessary to make D negative which will require an $\alpha$ of greater than two and the larger $Z_{L2}$ the larger must be $\alpha$.

The B and C terms of the Fig. 15 determinant have unlike signs, B being positive and C negative so that to keep $\Delta$ small it is necessary that the A and D terms also have unlike signs. If the load impedances are equal, the positive portions of the D term will be greater than the positive portions of the A term by an amount approximately equal to $r_c$. Therefore, it will be necessary to make the D term positive and the A term negative. From inspection this may be accomplished, for example, if $\alpha$ is approximately equal to 2 and if $Z_{L1}$ is small, which, as previously indicated, will also give the device approximately equal gain in both directions.

The B and C terms of the Fig. 16 determinant are both negative and the A term is positive. The D term, therefore, must be positive for stability which will require a small $\alpha$ for small $Z_{L2}$'s.

The signs of the determinant terms have been indicated in the above table immediately above each term with an asterisk denoting the signs made such by choice. From these signs the phase reversal characteristics of the various circuits may readily be determined. As previously indicated, there will be no phase reversal in a left to right transmission of $Z_{22}$ (D) and $Z_{21}$ (C) have the same sign. Therefore, it may be seen that the circuits of Figs. 5, 6, 8, 11, 12 and 13 will produce no phase reversals in a left to right transmission. Further, there will be no phase reversal in a right to left transmission if $Z_{11}$ (A) and $Z_{12}$ (B) have the same sign so that the same circuits will likewise produce no phase reversal in a right to left transmission. The remaining circuits will produce phase reversals in the transmissions in either direction.

In most of the 12 illustrative circuits, the currents generated in the collector branches agree in direction with the signal currents as just determined. Referring to Fig. 17, for example, which is the equivalent circuit of Fig. 9, the signal currents $i_1$ and $i_2$ have the same directions as the assumed positive mesh currents for positive applied voltages. Further, these currents agree in direction with the polarities of the equivalent generators 27 and 28. The same is true of the Fig. 10 embodiment whose equivalent circuit is shown in Fig. 18.

In some of the circuits, however, there is a conflict between the currents generated by the transistors and the signal currents. Fig. 19, for example, is the equivalent circuit for the Fig. 13 embodiment. The equivalent generator 29 should normally have a polarity as indicated by the signs in parentheses since the current flowing through $r_{e2}$ is into the base which should result in a collector current flowing out of the base. As determined above, this circuit produces no phase reversals so that for a positive $e_1$ the actual signal curent $i_2$ will be flowing in a clockwise direction which is in opposition to the polarity of the generator 29 as just determined; generator 29 will therefore actually have the opposite polarity. For a positive $e_2$, the current in both meshes will be counterclockwise and the mesh 2 current will then oppose the generator 30, which will then have the opposite polarity to that shown. The generators 29 and 30 are in effect opposing each other but the net current $i_2$, for a positive $e_1$, will be in the direction shown. A similar conflict between mesh and equivalent generator currents may be shown to exist in mesh 1 of the Fig. 12 embodiment.

In the above discussion, the transistors in each embodiment have been assumed to have identical parameters. If the transistors of each pair should have unlike parameters, however, it would not alter the principles or the application of the present invention, but would merely make the analysis of the various elements more laborious since it would necessitate, for example, denoting the parameters of each transistor with a unique subscript so that the determinant for Fig. 9, for example, would appear:

$\Delta =$ $$\begin{vmatrix} r_{b1}+r_{e1}+r_{c2}+r_{e2}-r_{m2}+Z_{L1} & r_{e1}+r_{c2}-r_{m2} \\ r_{e1}+r_{e2}-r_{m1} & r_{e1}+r_{c1}-r_{m1}+r_{b2}+r_{c2}+Z_{L2} \end{vmatrix}$$

(36)

The above determinant will become more apparent by referring to the equivalent circuit of the transistor portion of Fig. 9 shown in Fig. 17, which also includes the equivalent load impedances $Z_{L1}$ and $Z_{L2}$. Since the assumed positive current $i_1$ is, for the upper transistor, from the base to the emitter, i.e., the current flowing through $r_{e1}$ the resulting current in the collector ($r_{c1}$) will be from the collector into the base; therefore, the terminal of the equivalent generator adjacent the equivalent T junction is positive, denoting the direction of the "generated" collector current flow. In the lower transistor, the assumed positive current $i_1$ flows through the emitter ($r_{e2}$) into the base so that the collector current resulting therefrom flows out of the base and the generator 28 terminal remote from the lower T junction is positive.

In writing the determinant, a positive current $i_1$ will produce voltage drops due to $Z_{L1}$, $r_{b1}$, $r_{e1}$, $r_{e2}$, $r_{c2}$ and a voltage rise due to $r_{m2}$; therefore:

$$Z_{11}=r_{b1}+r_{e1}+r_{e2}+r_{c2}-r_{m2}+Z_{L1}$$

as is indicated in the above determinant. $r_{m2}$ is included in the self-impedance term $Z_{11}$ since both $r_{e2}$ and $r_{c2}$ are in mesh 1. A positive current $i_2$ will produce voltage drops in mesh 1 due to $r_{e1}$ and $r_{e2}$ but the voltage produced by $r_{m2}$ due to $i_2$ flowing through $r_{e2}$ is of the opposite polarity and more specifically a voltage rise so that $Z_{12}=r_{e1}+r_{e2}-r_{m2}$. $Z_{21}$ and $Z_{22}$ are determined by similar reasoning.

To further illustrate these principles, the equivalent circuit of Fig 10 is shown in Fig. 18. The emitter current in the upper transistor flows into the base so that the terminals of the equivalent generator 31 have polarities indicating that the collector current resulting therefrom flows out of the base. The current flow in the emitter of the lower transistor is out of the base; the generator 32 therefore has a polarity which drives current into the base. From inspection since $r_{m1}$ produces a voltage drop due to positive current flow in $r_{c1}$, and since $r_{m1}$ is common to both meshes, $r_{m1}$ will appear in the $Z_{11}$ and the $Z_{21}$ terms. Further, it will be negative since in both cases it represents a voltage rise for a positive $i_1$. Similarly, $r_{m2}$ will appear in the $Z_{12}$ and the $Z_{22}$ terms with a negative sign since it represents a voltage rise in series with the collector $r_{c2}$ due to a current $i_2$ in the equivalent emitter resistance $r_{e2}$. Therefore, for Fig. 18:

$\Delta =$ $$\begin{vmatrix} Z_{L1}+r_{e1}+r_{c1}-r_{m1}+r_{c2}+r_{b2} & r_{c1}-r_{m2}+r_{c2} \\ r_{c1}-r_{m1}+r_{c2} & Z_{L2}+r_{b1}+r_{c1}-r_{m2}+r_{c2}+r_{e2} \end{vmatrix}$$

(37)

The discussion thus far has omitted the battery supply circuits. In general these circuits comprise means to supply from a common battery a relatively large negative voltage, e.g. —60 volts, to the collector electrodes of each pair and a small positive voltage, e.g., one or two volts, to the emitter electrodes of each pair. The negative current supplied to the collector electrodes of each transistor flows principally through their associated base electrodes. Small amounts of this current, however are employed to provide the proper bias conditions. To accomplish this, bleeder resistances are provided connecting the base and emitter electrodes for direct currents. If the biasing resistors tend to shunt the signal to an undesirable extent, retard coils may be provided in series with the bleeder resistors in the emitter base path or where necessary. Retard coils may also be used to prevent undesirable shunting of the signal by the collector bias paths. Condensers are also used in some instances to shunt the bias resistors at the signal frequencies.

In Figs. 5, 6 and 8, proper bias potentials are derived from the batteries 33 by the resistors 34 and 35. Resistors 34 are larger than resistors 35 so that the emitter electrodes in each case are slightly positive with respect to their base electrodes. A condenser 36 provides a direct connection at the signal frequency for the emitter electrodes in the circuit of Fig. 6. In Fig. 8 retard coils 37 are connected in series with collector biasing path to prevent their unduly shunting the signaling currents. A single small resistor 38 is sufficient to provide proper electrode potentials for the circuit of Fig. 7.

Figs. 9, 11 and 14 are each biased in a similar manner. The collector biasing path in each case may be traced from the positive terminal of the battery 33 through a base resistor 39, from the base electrode of the lower transistor to the collector electrode thereof, from the latter through a base resistor 40 associated with the upper transistor, and through the base and collector electrodes of the upper transistors returning to the negative terminal of the battery. Emitter bias in each of these circuits is provided by bleeder resistors 41. The base resistors 39 and 40 in Fig 9 are by-passed by condensers 42; these resistors in Figs. 11 and 14 need not be by-passed since the circuits in which they are connected are already high resistance circuits so that the biasing resistors 39 and 40 are, to the signal currents, relatively small.

The biasing arrangements in Figs. 10 and 13 are also similar. In these circuits the collector electrodes 25 are connected together and the negative terminal of the battery 33 is connected to this junction. Resistors 43 provide a path from the positive terminal of the battery to the emitter electrodes with retard coils 44 completing the emitter-base direct-current path.

The biasing arrangements in Figs. 12, 15 and 16 are also similar, the direct current being fed in each of these cases, to the two transistors in series. For example, the main direct-current path in Fig. 12 may be traced from the negative terminal of the battery 33 to the collector electrode of the upper transistor, from the base electrode thereof through the retard coil 46 to the collector electrode of the lower transistor and from the base electrode thereof by way of the by-passed base resistor 47 to the positive terminal of battery. Emitter bias is provided by the bleeder resistors 48. The biasing paths in Figs. 15 and 16 may be similarly traced with the exception that a retard coil 49 is included in the emitter-base path of the lower transistor in Fig. 16.

Blocking condensers 50 are provided in the circuits of Figs. 5, 8, 10, 11, 12, 13, 14, 15 and 16. Also, condensers 36 are connected between the joined electrodes in the circuits of Figs. 6, 9, 12, 13, 15 and 16 to block the direct current and still provide substantially a direct connection at the signal frequencies between the joined electrodes. The connections between the two electrodes which are common to both meshes in the remaining circuits are inherently high resistance by virtue of the mode of connection and in most cases will not require by-pass condensers.

The various configurations fall more or less naturally into different classes with respect to the methods of feeding battery to them. Fig. 5, for example, consists of two transistors in a push-pull arrangement; these are more naturally fed in parallel as shown. Figs. 6, 7, 8, 10 and 13 represent other circuits which may naturally be fed in parallel. Other embodiments, for example, Fig. 9, are more naturally fed in series. The embodiments of Figs. 9, 11, 12, 14 and 15 are other embodiments which may be fed in series. The Fig. 16 embodiment may be fed either in parallel or series, the drawing indicating the latter.

The various configurations also fall into different classes with respect to whether they may be fed around the loop or whether a local source is necessary. Since the terminals of each path in the circuit of Fig. 5 are at the same direct-current potential a local source is necessary. Similarly, a local source will be necessary for the circuits of Figs. 6, 7, 8, 10, 13, 14 and 16. The series fed embodiments with the exception of Figs. 14 and 16 may readily be supplied over a loop since it will be obvious that in each of these embodiments the transformers may be located at a point remote from the transistors. These latter embodiments are thus particularly useful for unattended repeater operation where it is desirable to maintain the battery supplies at a central station, as for example, in a telephone system.

In some of the cases the battery supply might also be fed over a simplex path, that is, either plus or minus battery might be supplied to both sides of the path over the pair of wires leading to the amplifier with a return path being provided either by a return wire or by another simplex path. The circuits of Figs. 5, 6, 7 and 13, for example, may be supplied by this method.

What is claimed is:

1. A bilateral amplifier for interconnecting a pair of external circuits comprising a pair of transistors each having an emitter electrode, a collector electrode and a base electrode, means connecting together a pair of unlike electrodes, one from each transistor, means connecting one of said external circuits to a pair of electrodes, one from each transistor and other than the electrodes of said pair of unlike electrodes and means connecting the other of said external circuits to the remaining pair of electrodes.

2. A bilateral amplifier for interconnecting a first and a second energy source which comprises a first and a second transistor each having an emitter electrode, a collector electrode and a base electrode, means connecting together a pair of unlike electrodes, said pair comprising a first electrode of said first transistor and a first electrode of said second transistor, means connecting said first source in a circuit including said pair of unlike electrodes, a second electrode of said first transistor and a second electrode of said second transistor and means connecting said second source in a circuit including said pair of unlike electrodes, a third electrode of said first transistor and a third electrode of said second transistor.

3. A signal translation circuit including a bidirectional amplifier for interconnecting a pair of signalling circuits, said amplifier comprising a pair of transistors each having an emitter electrode, a collector electrode and a base electrode, means to apply signals from a first of said signalling circuits to a first pair of electrodes, means to apply signals from the other of said signalling circuits to a second pair of electrodes and means comprising a circuit having a relatively low impedance at the signalling frequency for connecting together a third pair of electrodes, said third pair comprising unlike electrodes and each of said pairs comprising one electrode of each of said transistors.

4. A bidirectional amplifier for transmitting signals in either a first or a second direction comprising a first and a second transistor each having an emitter electrode, a collector electrode and a base electrode, means connecting together a pair of unlike electrodes, said pair comprising the base electrode of said first transistor and the collector of said second transistor, an input circuit for signals being transmitted in said first direction and an output circuit for signals being transmitted in said second direction comprising the emitter electrodes of said transistors and said pair of electrodes, and an input circuit for signals being transmitted in said second direction and an output circuit for signals being transmitted in said first direction comprising the collector electrode of said first transistor, the base electrode of said second transistor and said pair of electrodes.

5. A bidirectional amplifier for interconnecting a first and second signalling circuit comprising a first and a second transistor each having an emitter electrode, a collector electrode and a base electrode, means connecting together the base electrode of said first transistor and the emitter electrode of said second transistor, means to apply signals from said first circuit to the emitter electrode of said first transistor and the collector electrode of said second transistor and means to apply signals from said second circuit to the collector electrode of said first transistor and the base electrode of said second transistor.

6. A bilateral amplifier for interconnecting a pair of load circuits comprising a first and a second transistor each having an emitter electrode, a collector electrode and a base electrode, means connecting together a pair of unlike electrodes, said pair comprising the base electrode of said first transistor and the collector electrode of said second transistor, means connecting one of said load circuits in a circuit including the emitter electrode of said first transistor, said pair of unlike electrodes, and the base electrode of said second transistor and means connecting the other of said load circuits in a circuit including the collector electrode of said first transistor, said pair of unlike electrodes and the emitter electrode of said second transistor.

7. A bidirectional amplifier for interconnecting a pair of signal sources comprising a first and a second transistor each having an emitter electrode, a collector electrode and a base electrode, means to apply signals from one of said sources to said base electrodes, means to apply signals from the other of said sources to the collector electrode of said first transistor and the emitter electrode of said second transistor and means connecting together the emitter electrode of said first transistor and the collector electrode of said second transistor.

8. A bidirectional amplifier for interconnecting a pair of signalling circuits, said amplifier comprising a first and a second transistor each having an emitter electrode, a collector electrode and a base electrode, means connecting together a pair of unlike electrodes, said pair comprising the base electrode of said first transistor and the collector electrode of said second transistor, means to apply signals from one of said signalling circuits to said emitter electrodes, means to apply signals from the other of said signalling circuits to the collector electrode of said first transistor and the base electrode of said second transistor, a source of direct current, means to apply direct current from said source over one of said signalling circuits to the collector electrode of said first transistor and to the base electrode of said second transistor and resistance means interconnecting each of said emitter electrodes with their associated base electrodes.

9. A bilateral amplifier for interconnecting a pair of signalling circuits comprising a first and a second transistor each having an emitter electrode, a collector electrode and a base electrode, means connecting together a pair of unlike electrodes, said pair comprising the emitter electrode of said first transistor and the collector electrode of said second transistor, a first circuit including, in series, said pair of unlike electrodes and first pair of electrodes, one from each transistor and other than the electrodes of said pair of unlike electrodes, a second circuit including, in series, said pair of unlike electrodes and a second pair of electrodes other than electrodes of said pair of unlike electrodes and other than the electrodes of said first pair, means for connecting one of said signalling circuits across said first circuit and means for connecting the other of said signalling circuits across said second circuit.

References Cited in the file of this patent

UNITED STATES PATENTS

| | | |
|---|---|---|
| 2,496,266 | Brode et al. | Feb. 7, 1950 |
| 2,531,076 | Moore | Nov. 21, 1950 |
| 2,585,077 | Barney | Feb. 12, 1952 |
| 2,620,448 | Wallace | Dec. 2, 1952 |